Oct. 20, 1925.
G. H. BEAUMONT ET AL
1,558,141
SPRING SUPPORT
Filed Oct. 27, 1921
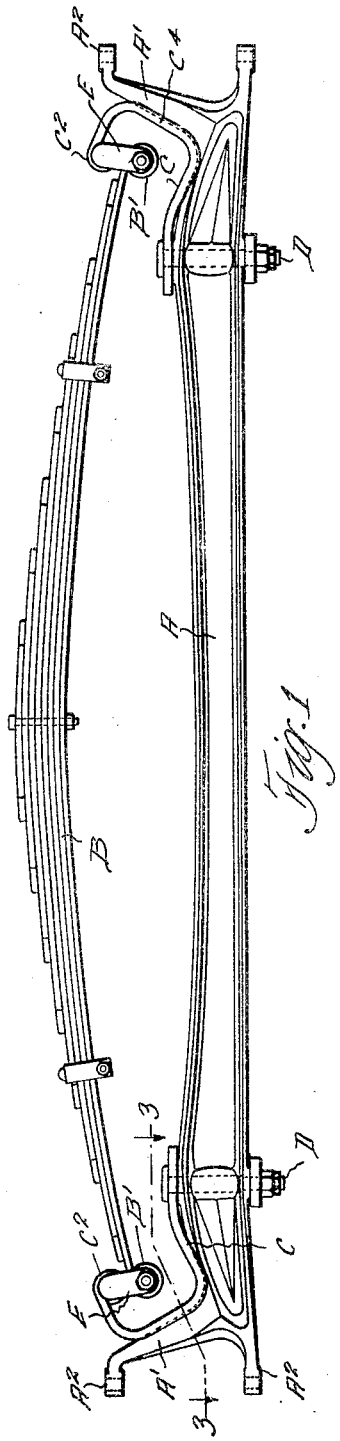
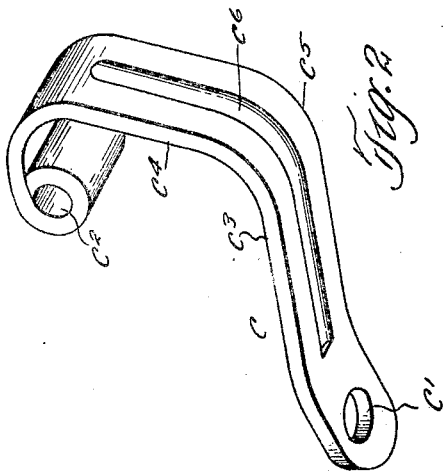
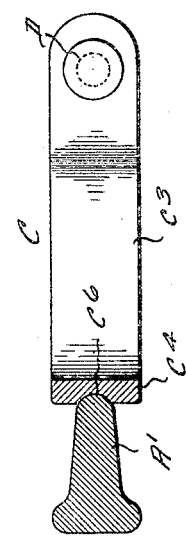
Inventors
George H. Beaumont
John C. Monteith
By Hull, Brock & West
Attys.

Patented Oct. 20, 1925.

1,558,141

UNITED STATES PATENT OFFICE.

GEORGE H. BEAUMONT AND JOHN C. MONTEITH, OF CLEVELAND, OHIO.

SPRING SUPPORT.

Application filed October 27, 1921. Serial No. 510,765.

*To all whom it may concern:*

Be it known that we, GEORGE H. BEAUMONT and JOHN C. MONTEITH, citizens of the United States, residing at Cleveland, in the county of Cuyahoga and State of Ohio, have invented a certain new and useful Improvement in Spring Supports, of which the following is a full, clear, and exact description, reference being had to the accompanying drawings.

This invention relates to the improved means for connecting the front spring of a Ford to the front axle thereof, the object being to provide a longer spring than the one commonly employed, thereby improving the riding quality of the car as a whole; and a still further object is to provide for the stability of the spring attaching means.

With these objects in view the invention consists in the novel features of construction and in the manner of combining or arranging the same, all of which will be more fully described hereinafter and then pointed out in the claim.

In the drawings forming a part of this specification, Fig. 1 is a face view of a Ford front axle provided with our improved spring supporting means; Fig. 2 is a detail perspective view of one of the supporting brackets; and Fig. 3 is a detail sectional view on the line 3—3 of Fig. 1.

Referring to the drawings A indicates the standard front axle of a Ford car, having the usual upwardly extending portions $A'$ and outwardly extending portions $A^2$ at each end.

B indicates the front spring composed of a plurality of leaves, the lowermost leaf terminating in an eye $B'$ at each end, and it will be noted that the gross width of the spring B is nearly as great as the axle A, whereas in the present type, the front spring is considerably shorter than the axle.

In order to support and connect a spring of this unusual length, I employ angular brackets C having apertures $C'$ at their inner ends and eyes $C^2$ at their outer ends.

Each bracket comprises the inner member $C^3$ and the outer member $C^4$ and this member turns inwardly and upwardly as at $C^5$, and the members $C^3$ and $C^4$ have a connecting groove or recess $C^6$ upon their outer faces which is adapted to receive a correspondingly shaped portion on the axle end and extension and hold the bracket rigid and against lateral displacement, the bolt D passing through the apertured end of the bracket and through the axle, in the usual manner.

The members $C^3$ are so shaped that there is slight clearance between said members and the adjacent portion of the axle and consequently when the bolt D is put through and the nut screwed up, the bracket arm C is forced tightly into engagement with the upwardly extending end A of the axle and the member $C^3$ bears against the inner side of bolt and thus eliminates the necessity of any clip.

The ends of the spring are connected to the ends of the bracket by means of the usual type of spring shackle E, one bolt passing through the eye in the end of the spring and the other through the eye in the bracket.

By having the brackets shaped in the manner shown and arranging them upon the axle at the widest points possible, we are able to properly support a spring of universal length thereby materially improving the elasticity of said spring in use. No changes or alterations to the axle are necessary.

Having thus described our invention, what we claim is:

The combination with an axle having ribbed portions and upwardly and outwardly extending end portions, of a spring arranged above said axle, oppositely disposed brackets connected near their inner ends to the top portion of the axle, each bracket having an inwardly extending portion which contacts with the top face of the axle, an upwardly and outwardly extending portion which contacts with the inner face of the upwardly extending portion of the axle and an inwardly and upwardly extending portion, and shackles for connecting the ends of the springs to the ends of said upwardly and inwardly extending portions of the brackets, the outwardly and upwardly extending portions of the brackets being grooved upon their faces contiguous to the axle and adapted to receive the ribbed portions of said axles and hold said brackets against lateral displacement, bolts for securing the inwardly extending portions to the axle, said inwardly extending portions being so shaped as to bind against said bolts and bear at their inner ends upon the top of axle as set forth.

In testimony whereof, we hereunto affix our signatures.

GEORGE H. BEAUMONT.
JOHN C. MONTEITH.